(12) United States Patent
Terada et al.

(10) Patent No.: US 8,107,995 B2
(45) Date of Patent: Jan. 31, 2012

(54) HINGE MECHANISM AND ELECTRONIC INCORPORATING THE SAME, AND ASSEMBLING METHOD THEREOF

(75) Inventors: Shigehiro Terada, Saitama (JP);
Yuuichirou Kimura, Saitama (JP);
Yoshihito Ishiguro, Tokyo (JP); Akira Yamada, Tokyo (JP)

(73) Assignees: NEC Corporation, Tokyo (JP); Techno Associe Co., Ltd., Osaka (JP)

( * ) Notice: Subject to any disclaimer, the term of this patent is extended or adjusted under 35 U.S.C. 154(b) by 459 days.

(21) Appl. No.: 11/570,201

(22) PCT Filed: Jun. 8, 2005

(86) PCT No.: PCT/JP2005/010897
§ 371 (c)(1),
(2), (4) Date: Dec. 7, 2006

(87) PCT Pub. No.: WO2005/121572
PCT Pub. Date: Dec. 22, 2005

(65) Prior Publication Data
US 2007/0197268 A1    Aug. 23, 2007

(30) Foreign Application Priority Data
Jun. 8, 2004    (JP) ................................. 2004-170193

(51) Int. Cl.
*H04B 7/14*    (2006.01)
*H04M 1/00*    (2006.01)
(52) U.S. Cl. ....... 455/550.1; 455/16; 455/361; 379/433; 439/31; 439/65
(58) Field of Classification Search .................. 455/90.3, 455/556.1, 575.3; 361/679.6; 16/367
See application file for complete search history.

(56) References Cited

U.S. PATENT DOCUMENTS

| | | | | |
|---|---|---|---|---|
| 6,980,424 B2 * | 12/2005 | Kim et al. | ................. | 361/679.06 |
| 7,155,781 B2 * | 1/2007 | Yamada et al. | ................. | 16/367 |
| 7,168,135 B2 * | 1/2007 | Jung et al. | ........................ | 16/367 |
| 7,272,423 B2 * | 9/2007 | Satoh et al. | ................. | 455/575.3 |
| 7,289,627 B2 * | 10/2007 | Satoh et al. | ................. | 379/433.13 |
| 7,512,428 B2 * | 3/2009 | An et al. | ..................... | 455/575.3 |
| 2004/0141287 A1 * | 7/2004 | Kim et al. | ..................... | 361/683 |
| 2004/0203532 A1 * | 10/2004 | Mizuta | ......................... | 455/90.3 |
| 2004/0203535 A1 * | 10/2004 | Kim et al. | ................... | 455/90.3 |
| 2004/0209645 A1 * | 10/2004 | Park et al. | ................... | 455/556.1 |
| 2004/0227045 A1 * | 11/2004 | An et al. | ..................... | 248/278.1 |
| 2005/0064919 A1 * | 3/2005 | An et al. | ..................... | 455/575.3 |
| 2006/0021195 A1 * | 2/2006 | Yamada et al. | ................. | 16/367 |
| 2006/0111160 A1 * | 5/2006 | Lin et al. | ..................... | 455/575.3 |
| 2006/0246964 A1 * | 11/2006 | Castaneda et al. | ......... | 455/575.3 |

FOREIGN PATENT DOCUMENTS

| | | | |
|---|---|---|---|
| CN | 1473003 A | | 2/2004 |
| JP | 2002-266839 A | | 9/2002 |
| JP | 2002-310129 A | | 10/2002 |
| JP | 2004-44743 A | | 2/2004 |
| JP | 2004-138092 A | | 5/2004 |
| JP | 2005-106217 A | | 4/2005 |
| JP | 2005106217 | * | 4/2005 |
| WO | WO 2004/036069 A1 | | 4/2004 |

* cited by examiner

*Primary Examiner* — Jinsong Hu
*Assistant Examiner* — William Nealon
(74) *Attorney, Agent, or Firm* — Sughrue Mion, PLLC

(57) ABSTRACT

A conventional horizontal axis portion is divided into two to have a triaxial structure including a vertical axis portion. Fixing these portions by a hinge main body enables stress and moment applied to each part to be reduced, resulting in realizing down-sizing of a biaxial hinge as a whole.

9 Claims, 18 Drawing Sheets

HINGE MECHANISM AND ELECTRONIC INCORPORATING THE SAME, AND ASSEMBLING METHOD THEREOF

FIELD OF THE INVENTION

The present invention relates to a biaxial hinge mechanism as a mechanism part of portable electronic apparatuses such as a mobile phone, a video cam recorder and a digital camera.

DESCRIPTION OF THE RELATED ART

Mobile phones and PHS (Personal Handy Phone Systems) have their total number of domestic subscribers exceeding 87 millions (as of the end of May in 2004) to become common belongings. Although main functions of these apparatuses are to make telephone conversation, they have been recently evaluated to have more complex form having an electronic mail browsing function, a web browsing function, a photographing function and the like. Conventional simple foldable form has been failing to cope with such advanced functions and examples are found of a structure in which a biaxial hinge is used in place of a uniaxial hinge that conventionally allows only rotation. "Biaxial hinge" here denotes a hinge having two rotation axes, which two axes are disposed orthogonal to each other in general.

FIG. 1 to FIG. 5 are figures for use in explaining a state change of an upper casing 2 of a foldable mobile phone 1 in which a conventional biaxial hinge is adopted. The foldable mobile phone 1 shown in these figures is characterized in having a biaxial hinge with other rotation axis rotating around a rotation axis "fixed" to the vicinity of a shorter side of a lower casing 3.

The following description will be made with the axis of a biaxial hinge 21 provided substantially parallel to the shorter side of the lower casing 3 represented as a horizontal axis 101 and the axis of the biaxial hinge 21 provided substantially vertical to the shorter side of the casing 3 as a vertical axis 102.

FIG. 1 shows a folded mobile phone having a biaxial hinge. In this state, a display unit 11 is accommodated to face to the lower casing 2. FIG. 2 is a view showing a state where the upper casing 2 facing to the lower casing 3 is opened at an angle of substantially 90 degrees centered around the horizontal axis 101. FIG. 3 is a view showing a state where the upper casing 2 is turned through an angle of substantially 90 degrees centered around the vertical axis 102 from the state shown in FIG. 2. FIG. 4 is a view showing a state where the display unit 11 faces back-to-back to the lower casing 3 after further turning through an angle of 90 degrees centered around the vertical axis 102 from the state shown in FIG. 3. In this state, closing the upper casing 2 at an angle of substantially 90 degrees centered around the horizontal axis 101 enables the upper casing 2 and the lower casing 3 to be closed with the display unit 11 exposed externally.

FIG. 5 shows a state where the display unit 11 is exposed externally. In this state, checking of electronic mail or use of a photographing function with a wide screen are allowed.

FIG. 6 is a trihedral view related to a conventional biaxial hinge. The biaxial hinge is formed of a horizontal axis portion 701, a vertical axis portion 702 and a horizontal axis fixing portion (bracket) 703. Then, the horizontal axis portion 701 has a vertical through hole 711 which allows the vertical axis portion 702 to go through. This enables the vertical axis portion 702 to rotate centered around the horizontal axis 101 formed by the horizontal axis portion 701 and also to turn centered around the vertical axis 102. The horizontal axis fixing portion 703 is a member for fixing the horizontal axis portion 701 at a fixed position. In addition, to apply appropriate torque at the time of turning, a flat spring 704 is fit in a contact surface between the horizontal axis portion 701 and the vertical axis portion 702 to generate constant torque when the upper casing is turned.

By the horizontal axis fixing portion 703, the horizontal axis portion 701 is fixed to the lower casing 3, thereby fixing the horizontal axis 101 to the lower casing or a substrate.

Since in a common foldable mobile phone (not shown), in order to produce appropriate torque when the upper casing 2 is folded or opened, a horizontal axis portion (not shown) is formed of a plurality of parts. Also in a foldable cellular phone using a conventional biaxial hinge, the horizontal axis portion 701 is formed of a plurality of parts including a spring.

Such structures, however, involve the following shortcomings.

More specifically, because the vertical through hole 711 should be opened in the horizontal axis portion 701, the horizontal axis portion 701 needs to have a thickness larger than the hole and large enough to satisfy design strength. Therefore, the size of the biaxial hinge itself is made larger accordingly to prevent down-sizing.

Another shortcoming is that providing the vertical through hole 711 in the horizontal axis portion 701 generates stress concentration to possibly damage a part. A further shortcoming is that extending an axis length of the horizontal axis portion 701 increases moment which is obtained by the length and force, possibly resulting in causing such a problem as torsion or wrench.

A still further shortcoming is that since use of the flat spring 704 for applying torque to the vertical axis portion 702 will exert the same torque irrespective of a turning angle of the vertical axis portion 702, when applying induction torque at a predetermined angle, the horizontal axis portion 701 and the upper casing 2 should be processed.

The present invention aims at solving these shortcomings, whose object is to solve the problem of strength of parts by dividing the conventional horizontal axis portion 701 into three and using an appropriate member for each. In addition, since a processing method can be modified according to a member, costs of parts can be reduced.

Furthermore, providing the vertical axis with a D cut and making a groove on the vertical axis contact end surface of the horizontal axis to prevent turning in the vertical axis direction unless the horizontal axis is opened at an appropriate angle prevents the casings from coming into contact, thereby enabling peel-off of painting of the surfaces of the casings to be avoided and also providing a spring in the horizontal axis direction enables appropriate torque to be applied according to a turning angle of the vertical axis to generate induction torque.

SUMMARY OF THE INVENTION

A biaxial hinge according to the present invention is formed of three axial parts.

The three axial parts are a first horizontal axis portion, a second horizontal axis portion and a vertical axis portion, with the first horizontal axis portion and the second horizontal axis portion disposed on the same horizontal axis and the vertical axis portion disposed between an axis end of the first horizontal axis portion and an axis end of the second horizontal axis portion.

The vertical axis portion may be arranged to have its axis side surfaces be in contact with the axis end of the first horizontal axis portion and the axis end of the second horizontal axis portion.

Furthermore, substantially facing two sides of the axis side surfaces of the vertical axis portion may be cut out and a groove may be provided in an end surface of the first horizontal axis portion in contact with the vertical axis portion.

The second horizontal axis portion is formed of a pan, an elastic body and a second horizontal axis portion main body to enable application of torque when the vertical axis portion is turned.

In addition, the elastic body forming the second horizontal axis portion may be a coiled spring.

Furthermore, the groove of the first horizontal axis portion may be provided on the horizontal axis or provided out of the horizontal axis.

Moreover, the second horizontal axis portion may be fixed by a stopper, and the stopper may fix the second horizontal axis portion by snap-fit.

In addition, in a biaxial hinge manufacturing method according to the present invention, the biaxial hinge including an axis main body portion having one opening surface on the horizontal axis and axis through holes in a surface facing to the opening surface and in two surfaces on the vertical axis, one vertical axis part, a first horizontal axis part and a second horizontal axis part is characterized in that the first horizontal axis part is inserted into the axis through hole on the horizontal axis from the opening surface and then the vertical axis part is inserted into the two axis through holes on the vertical axis to dispose the second horizontal axis part on the horizontal axis so as to be exposed from the opening surface.

It is further characterized in that the axis main body portion includes a stopper conversion hole, so that after disposing the second horizontal axis part, the stopper is inserted into the stopper conversion hole to fix the second horizontal part.

DESCRIPTION OF THE PREFERRED EMBODIMENT

In the following, embodiments will be described with respect to problems to be solved by the present invention. The following embodiments may be partially implemented or implemented in combination. Since structure of a main body of a mobile phone is the same as conventional one, the structure shown in FIG. 1 to FIG. 5 will be used without modification.

First Embodiment

Figure 7:
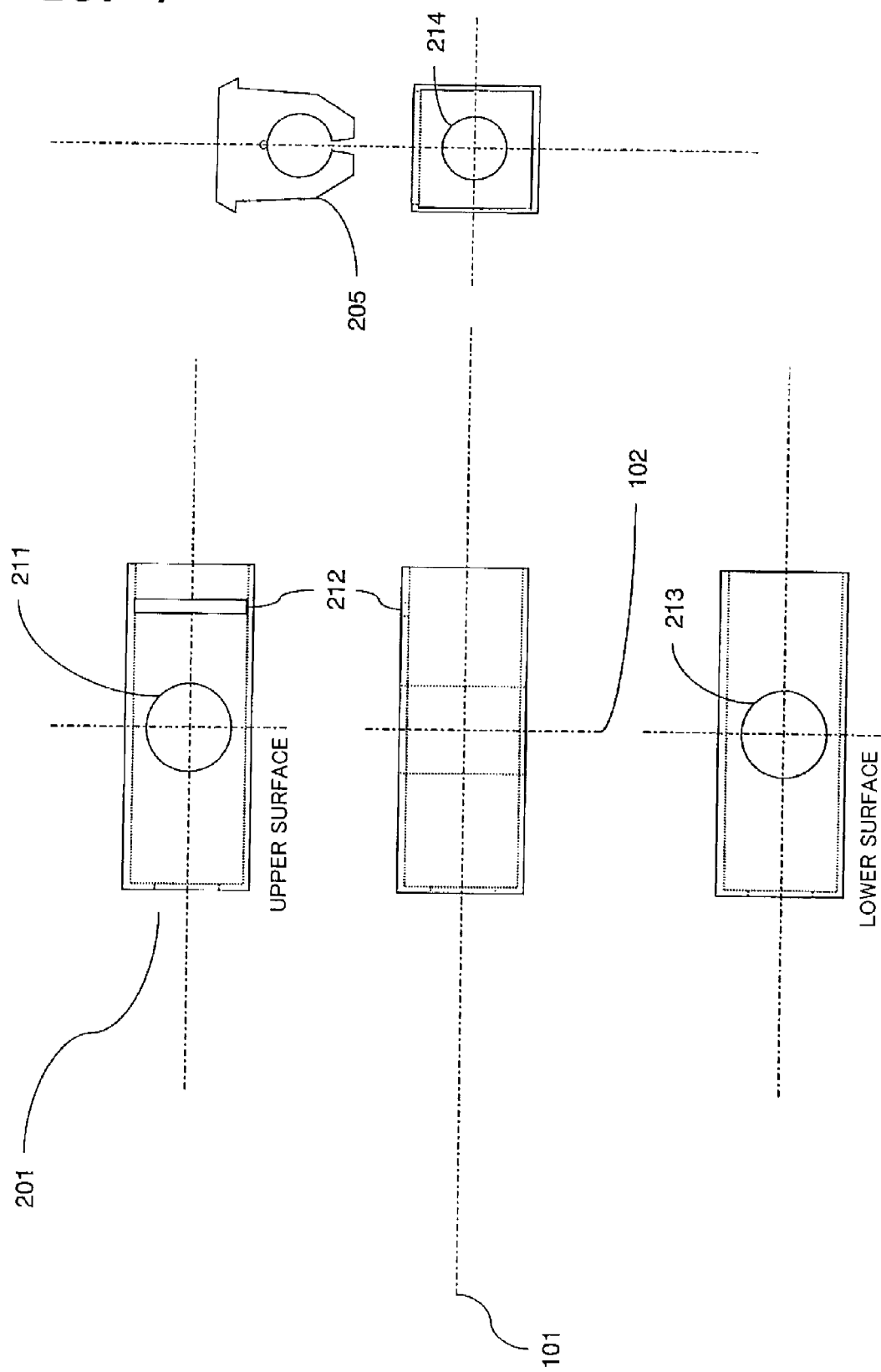
FIG. 7 is a tetrahedral view of a hinge main body portion according to a first embodiment of the present invention and a plan view of a hinge stopper.
Figure 8:
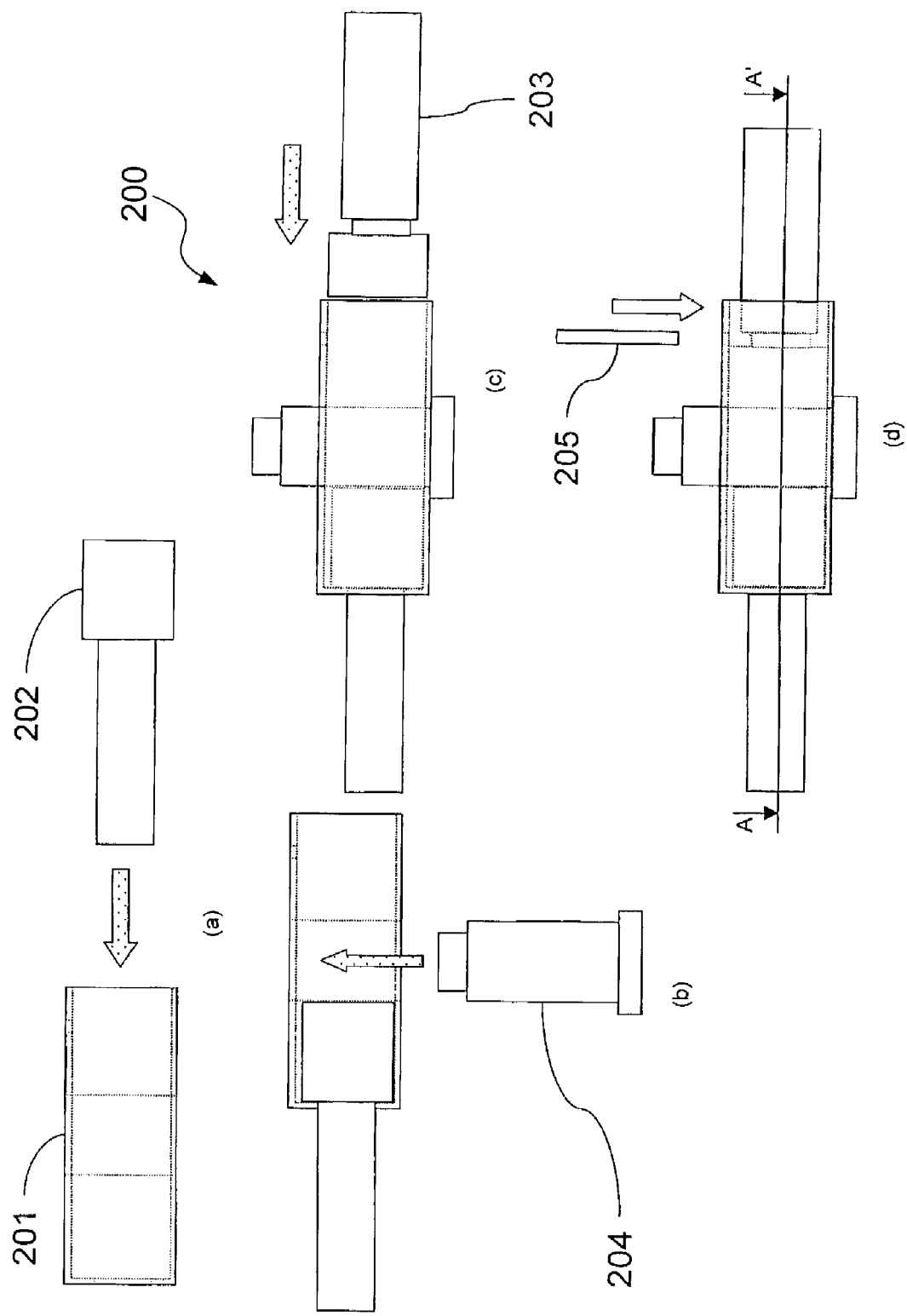
FIG. 8 is a view showing a biaxial hinge assembling process according to the first embodiment of the present invention.

With reference to FIG. 7 and FIG. 8, structure of a hinge 200 according to a first embodiment will be described.

FIG. 7 shows a tetrahedral view illustrating a hinge main body portion 201 as a structural member and a plan view of a hinge stopper 205, and FIG. 8 is a process view showing a assembling procedure in the first embodiment.

The biaxial hinge 200 according to the first embodiment is formed of the hinge main body portion 201, a first horizontal axis portion 202, a second horizontal axis portion 203, a vertical axis portion 204 and the stopper 205.

The hinge main body portion 201 is a structural member for fixing each portion, which is a member required to have mechanical strength.

Figure 6:
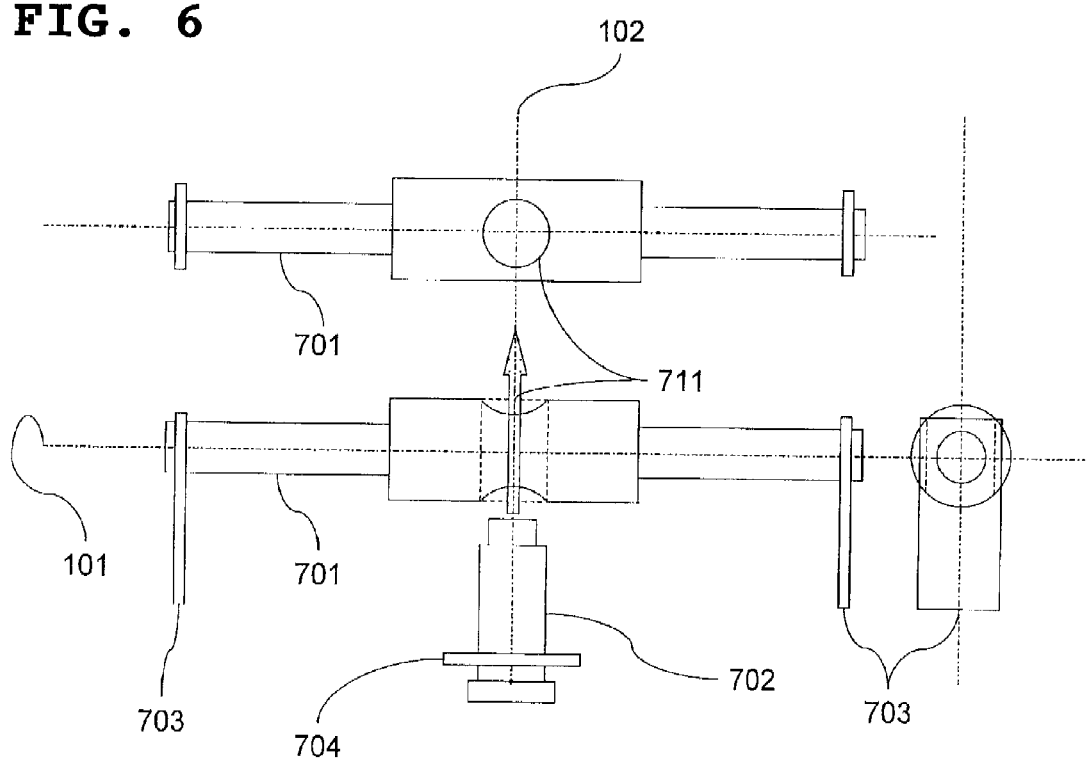
FIG. 6 is a trihedral view showing a conventional biaxial hinge.

The first horizontal axis portion 202 and the second horizontal axis portion 203 are members equivalent to the horizontal axis portion 701 shown in FIG. 6, which two form the horizontal axis 101. The first horizontal axis portion 202 and the second horizontal axis portion 203 are fixed to sandwich the vertical axis portion 204 by their end surfaces.

Although it is in practice formed of a plurality of parts in order to generate appropriate torque at the time of turning operation centered around the horizontal axis 101, the embodiment of the present invention will be described assuming that they are formed of the two, first horizontal axis portion 202 and the second horizontal axis portion 203 for the sake of simplification. Under actual use conditions, the horizontal axis is fixed to a substrate or a casing. Also in the present embodiment, the first horizontal axis portion 202 and the second horizontal axis portion 203 are fixed to the lower casing 3 or the like in actual use, whose fixing method is not limited.

The vertical axis portion 204 is a member forming the vertical axis 102. In the present embodiment, the member has no difference from a conventional member in particular.

The hinge stopper 205 is a member for fixing the second horizontal axis portion 203 to the hinge main body portion 201. Although in the present embodiment, the figures are drawn assuming that it is fixed by using a method by snap-fit, a fixing method is not particularly limited to snap-fit.

FIG. 7 shows a tetrahedral view of the hinge main body portion 201 and a plan view of the hinge stopper 205 in the present embodiment. Although it is assumed here that the hinge main body portion 201 is formed by a metal injection mold, its process is not necessarily limited. Since the present part is a structural member, it is essential to make it maintain sufficient strength after setup.

The hinge main body portion 201 is formed to be a hollow and substantially rectangular parallelepiped. Provided on an upper surface of the hexahedron are a vertical through hole 211 for passing the vertical axis portion 204 through and a stopper hole 212 for passing the hinge stopper 205 through. Similarly, on a lower surface of the hinge main body portion 201, a vertical through hole 213 for passing the vertical axis portion 204 through is provided.

Of the hinge main body portion 201, on one end surface crossing perpendicular to the horizontal axis 101, a first horizontal axis through hole 214 for passing the first horizontal axis portion 202 through is provided. On the other hand, the other end surface crossing perpendicular to the horizontal axis 101 is opened. Through the opening surface (opening portion), the first horizontal axis portion 202 and the second horizontal axis portion 203 are incorporated into the hinge main body portion 201.

Next, a specific method of setting up a hinge will be described with reference to FIG. 8.

First, into the hinge main body portion 201, the first horizontal axis portion 202 is inserted through the opening surface (opening portion) (FIG. 8(a)).

Next, the vertical axis portion 204 is inserted through the vertical through hole 213 and the vertical through hole 211 to form the vertical axis 102 in the biaxial hinge 200 (FIG. 8(b)).

Thereafter, the second horizontal axis portion 203 is inserted into the hinge main body portion 201 through the opening surface (FIG. 8(c)) and the hinge stopper 205 is pushed in through the stopper hole 212 to fix the second horizontal axis portion 203 (FIG. 8(d)).

Figure 9:
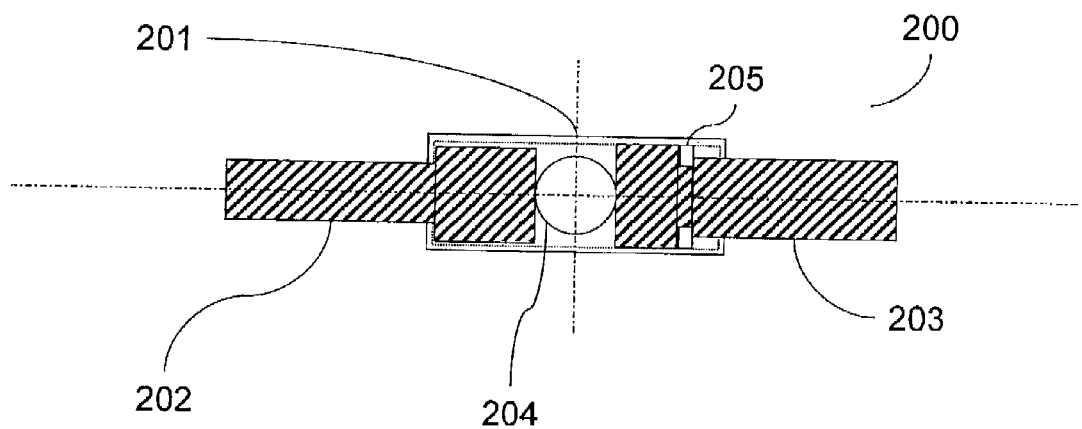
FIG. 9 is a sectional view of the biaxial hinge according to the first embodiment of the present invention.

FIG. 9 is a sectional view of the biaxial hinge 200 being set up which is seen from a section A-A' in FIG. 8.

By thus forming the biaxial hinge, individual parts can be reduced in size while ensuring strength. As a result, down-sizing of the biaxial hinge with all the parts set up can be realized as a whole. Also realized is down-sizing of an electronic apparatus incorporating the biaxial hinge as a whole.

Although in the present embodiment, the stopper hole 212 is disposed on the upper surface of the hinge main body portion 201, the arrangement is not necessarily limited thereto. It may be disposed, for example, on the side surface or the lower surface of the hinge main body portion 201.

Second Embodiment

Next, a second embodiment of the present invention will be described with reference to FIG. 10 to FIG. 12. The present embodiment, paying attention to that the first horizontal axis portion 202 and the second horizontal axis portion 203 are fixed to the lower casing or the like, aims to regulate turn of the vertical axis portion. As to a member whose description will not be made in particular, the equivalent member in the first embodiment will be used as it is.

Figure 10:
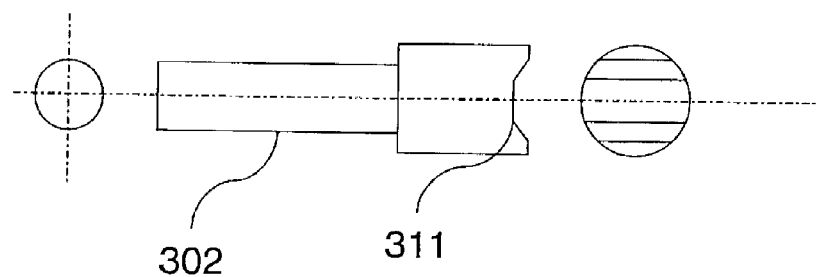
FIG. 10 is a trihedral view of a first horizontal axis portion according to a second embodiment of the present invention.
Figure 11:
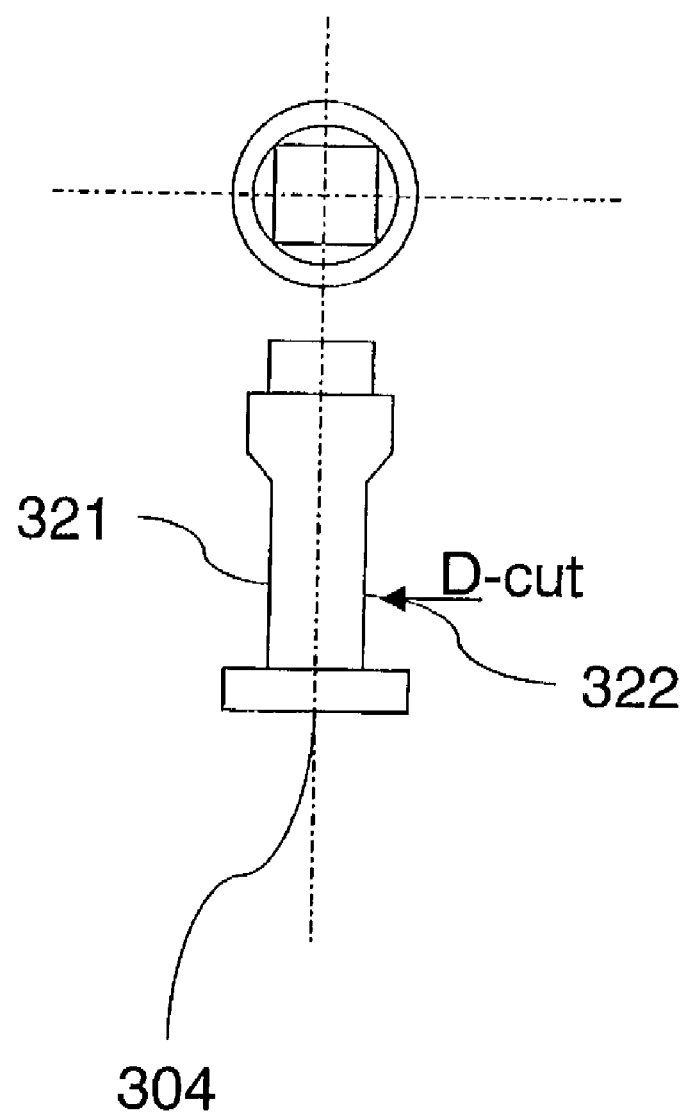
FIG. 11 is a dihedral view of a vertical axis portion according to the second embodiment of the present invention.

FIG. 10 is a trihedral view obtained when a first horizontal axis portion 302 used in the present embodiment is seen from three directions and FIG. 11 is a dihedral view obtained when a vertical axis portion 304 is seen from two directions.

The first horizontal axis portion 302 used in the second embodiment has a groove portion 311 formed in the axis end portion in contact with the vertical axis portion 304.

On the other hand, in the vertical axis portion 304, two areas (two sides) of the axis portion side surface facing to the vertical axis 102 are vertically cut out by D cut. Hereafter, the cut-out will be referred to as a cut-out surface 321 and a cut-out surface 322. Combining these obtains a structure which enables the vertical axis portion 304 to turn only when the upper casing 2 and the lower casing 3 are opened at a specific angle.

Figure 12:
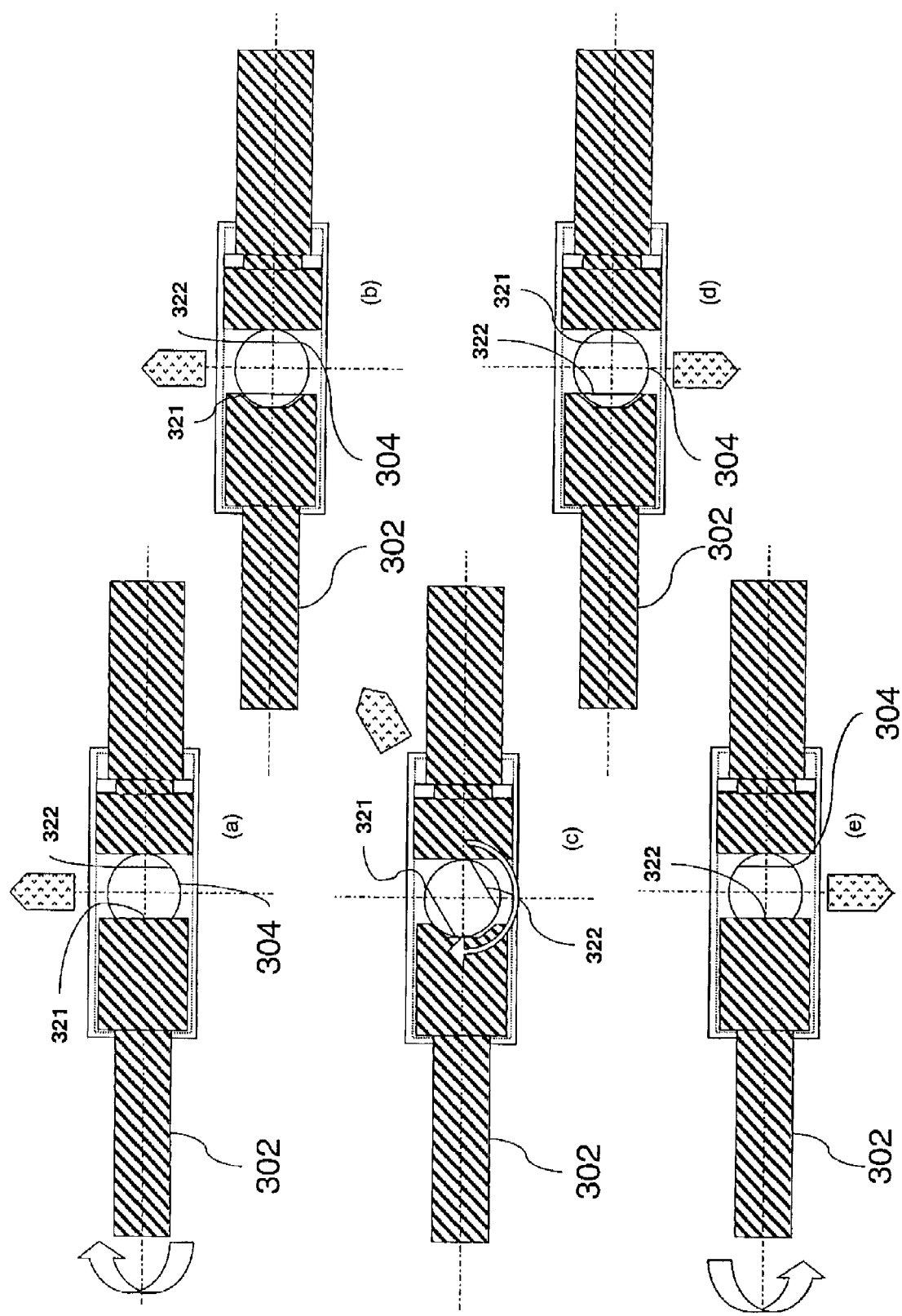
FIG. 12 is a sectional operational view showing operation of a biaxial hinge according to the second embodiment of the present invention.

FIG. 12 is a view showing in what state a section of the biaxial hinge 301 set up by using the first horizontal axis portion 302 and the vertical axis portion 304 moves (equivalent to FIG. 9 of the first embodiment). The figure explains how the hinge operates according to a state change of the casing in the foldable mobile phone using the biaxial hinge shown in FIG. 1 to FIG. 5. The pentagonal arrow used in the figure represents to which direction the display unit 2 faces.

When the casing is closed (the state shown in FIG. 1), the groove portion 311 is orthogonal to the cut-out portion 321. Therefore, even when turning the vertical axis portion 304, the cut-out portion 321 regulates (restricts) the first horizontal axis portion 302. As a result, the upper casing 2 can not be turned centered around the vertical axis 102 (FIG. 12(a)).

Figure 1:
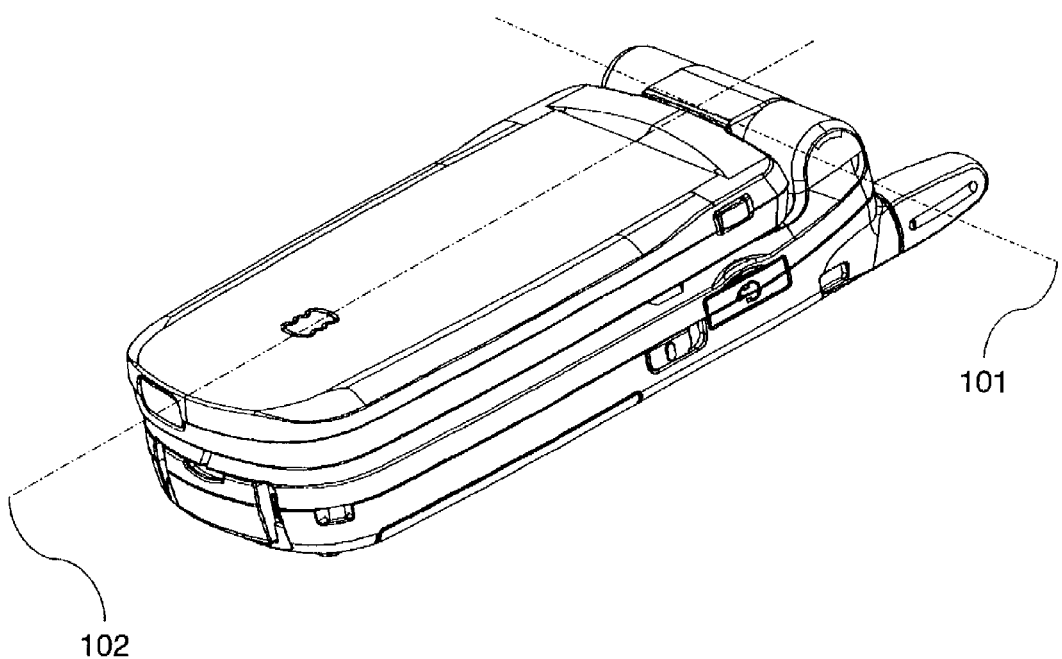
FIG. 1 is a perspective view of a mobile phone adopting a biaxial hinge, whose casing is closed with a display unit accommodated.
Figure 2:
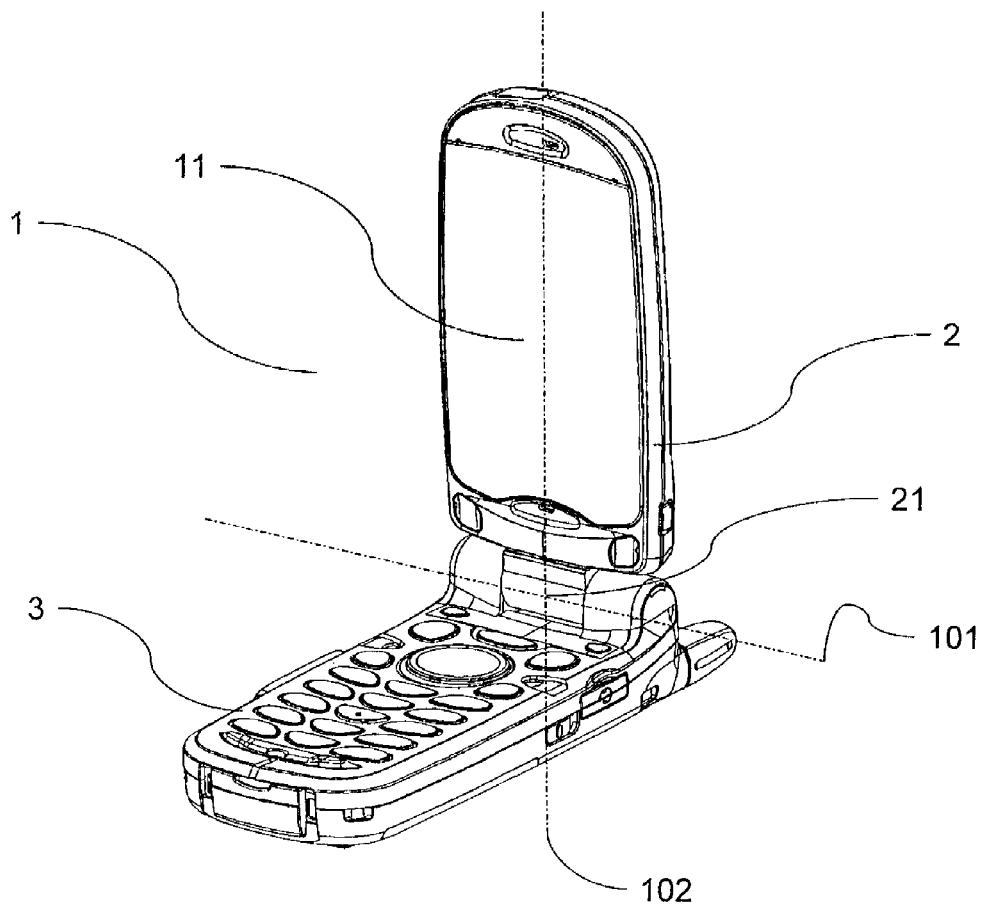
FIG. 2 is a perspective view of the mobile phone adopting a biaxial hinge, with an upper casing opened.
Figure 3:
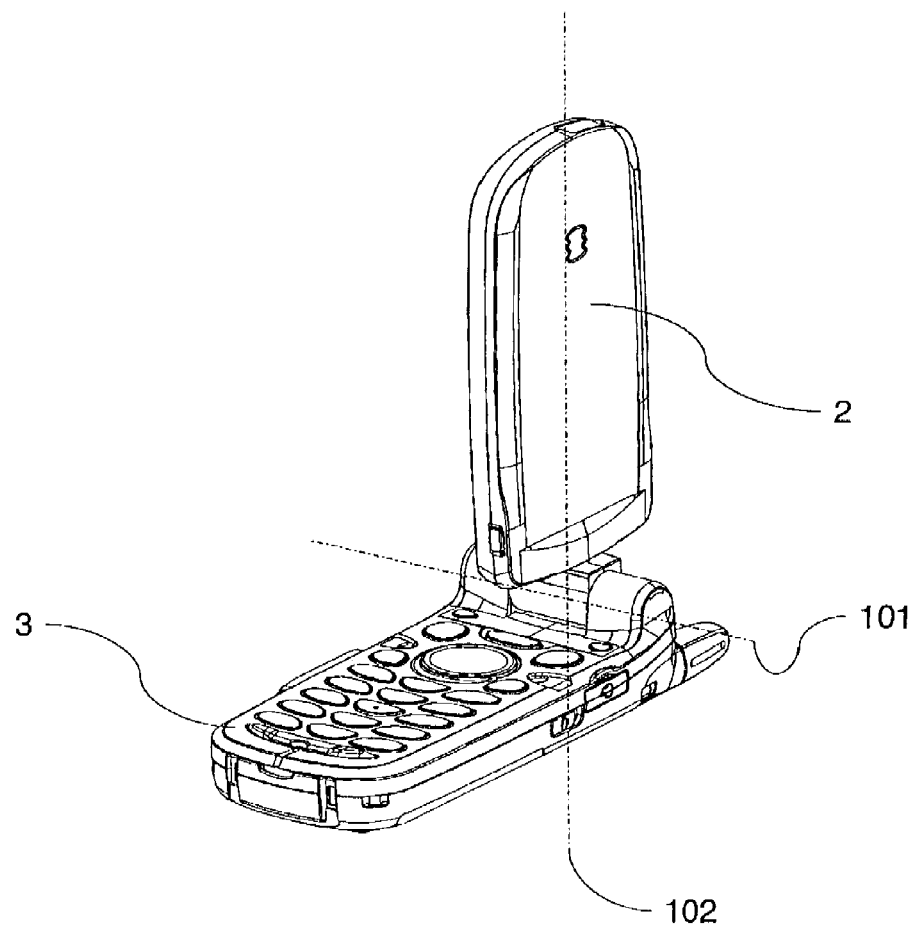
FIG. 3 is a perspective view of the mobile phone adopting a biaxial hinge, with the upper casing turned.
Figure 4:
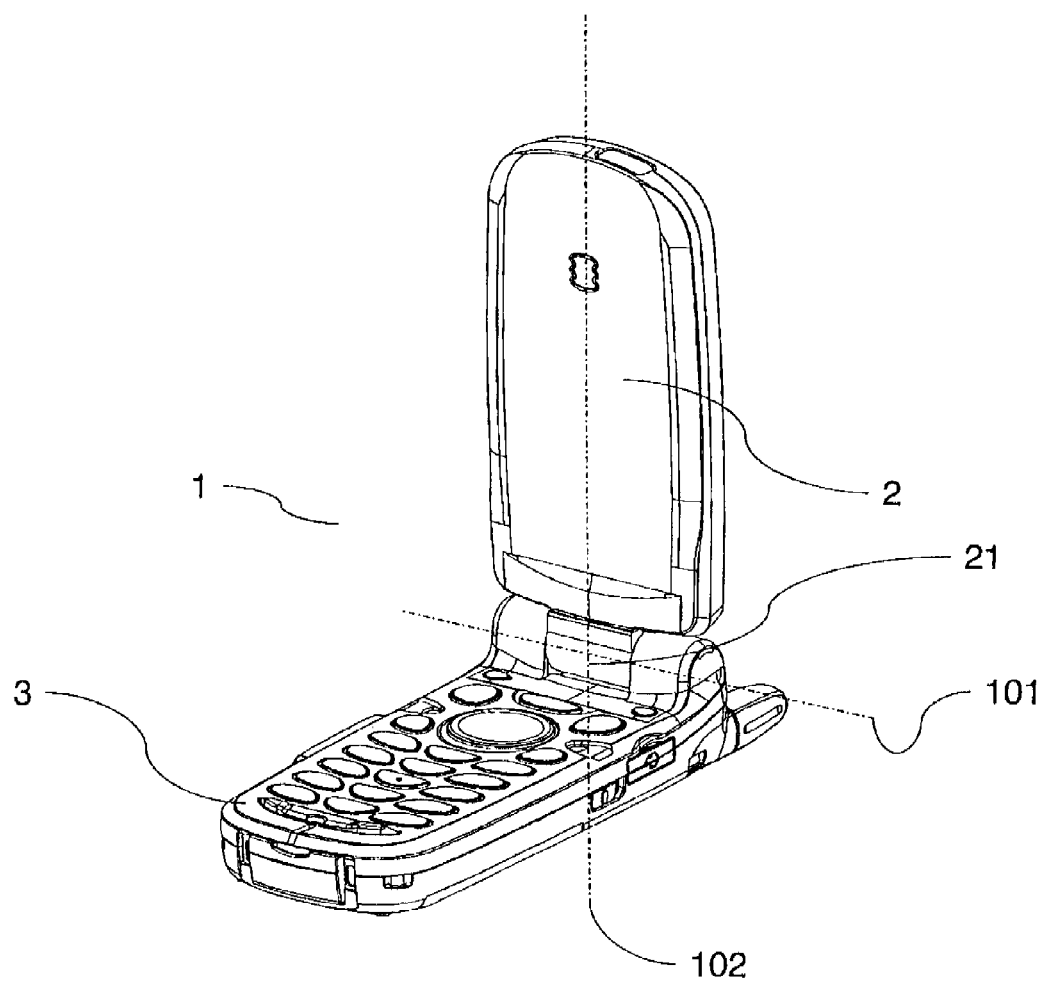
FIG. 4 is a perspective view of the mobile phone adopting a biaxial hinge, with the upper casing turned through 180 degrees.
Figure 5:
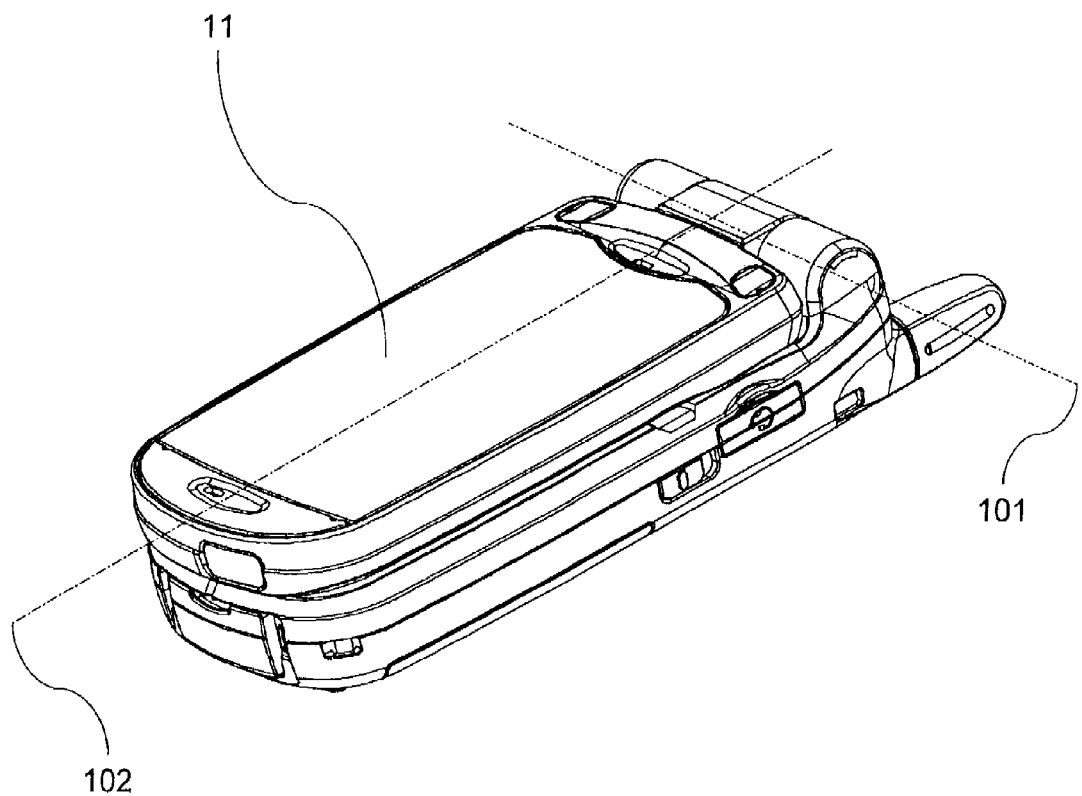
FIG. 5 is a perspective view of the mobile phone adopting a biaxial hinge, whose casing is closed with a display unit exposed.

Next, when the upper casing 2 is opened to be perpendicular to the lower casing 3 (the state shown in FIG. 2), the groove portion 311 is brought into parallel to the cut-out portion 321 (FIG. 12(b)). This makes a distance from the vertical axis 102 to the groove 311 be longer than a radius of the vertical axis portion 304 in contact with the first horizontal axis portion 302, resulting in preventing the first horizontal axis portion 302 from regulating the turning operation of the vertical axis portion 304. As a result, it will be possible to turn the upper casing 2 centered around the vertical axis 102 as shown in FIG. 3 (FIG. 12(c)).

When the upper casing 2 enters a turned state, an area of the vertical axis portion 304 in which neither the cut-out portion 321 nor the cut-out portion 322 is provided will thrust into the groove portion 311. Accordingly, operation of closing the upper casing 2 centered around the horizontal axis 101 will be restricted and disabled.

When the display unit is rotated through 180 degrees (FIG. 4), the cut-out surface 322 is brought to face to the first horizontal axis portion 302 (FIG. 12(d)). This enables operation of closing the upper casing 2 to allow accommodation in the state shown in FIG. 5. FIG. 12(e) shows an internal structure of the hinge obtained when entering the state of FIG. 5.

As described in the foregoing, by improving the structure of the first horizontal axis portion 302 and the vertical axis portion 304, the second embodiment prevents an operator from executing operation not expected in designing. This enables a mobile phone to be used without damaging the surface of the casing by opening and closing operation of the casing.

Third Embodiment

Adopting the structures according to the foregoing embodiments enables parts to be reduced in size and unexpected operation by an operator to be restricted. Next, description will be made of a structure for applying torque (induction torque) appropriate for turning operation of the upper casing 2 centered around the vertical axis 102 with respect to other embodiment. In the third embodiment, the second horizontal axis portion 203 in the first embodiment is formed by a plurality of parts to apply torque to the vertical axis portion. Except a hinge stopper 405, the same parts in the second embodiment will be used.

Figure 13:
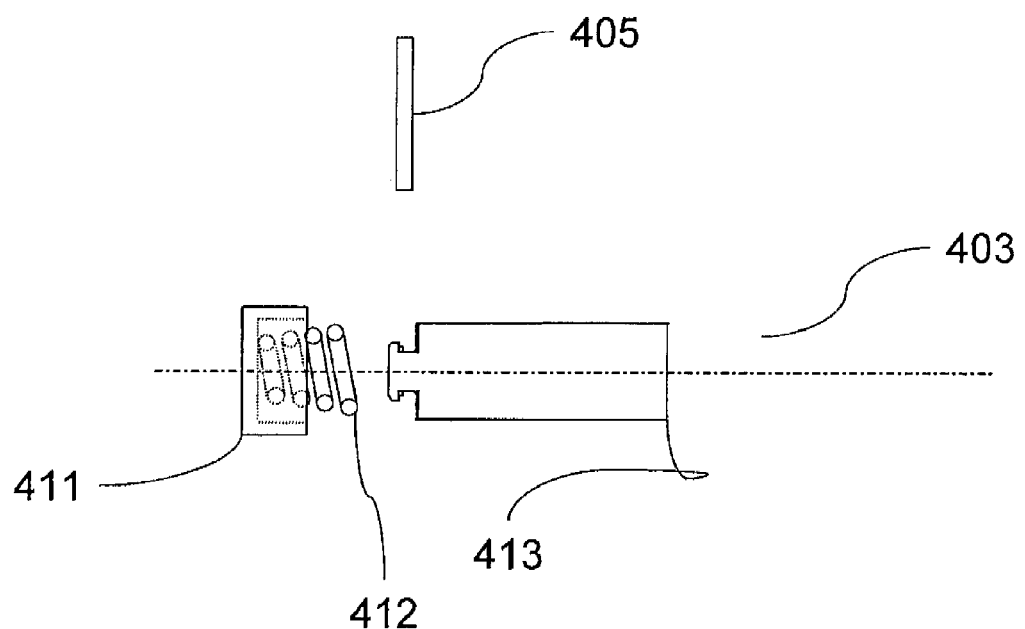
FIG. 13 is a view showing structure of a second horizontal axis portion according to a third embodiment of the present invention.

FIG. 13 is a view showing a structure of an end portion of a second horizontal axis portion 403 which is in contact with the vertical axis portion 304 in the third embodiment. The second horizontal axis portion 403 is formed of three parts, a pan 411, a spring (elastic body) 412 and a second horizontal axis portion main body 413.

The spring 412 is a part which applies spring stress to the vertical axis portion 304 as torque. Then, the pan 411 is provided for receiving the spring stress generated by the spring 412 and transmitting the spring stress evenly to the vertical axis portion 304.

Similarly to the hinge stopper 205 in the first embodiment, the hinge stopper 405 is a member for fixing the second horizontal axis portion 403. While in the first embodiment, because the second horizontal axis portion 403 is one part, the hinge stopper 205 is attached last, in the present embodiment, the hinge stopper 405 is attached prior to the second horizontal axis portion main body 413.

The second horizontal axis portion main body 413 is a member including a mechanism for applying torque to the horizontal axis 201 and the like.

The hinge stopper 405 has a snap-fit structure similarly to that of the first embodiment. Only the difference resides in a diameter of the second horizontal axis portion main body 413 to be pushed in.

Figure 14:
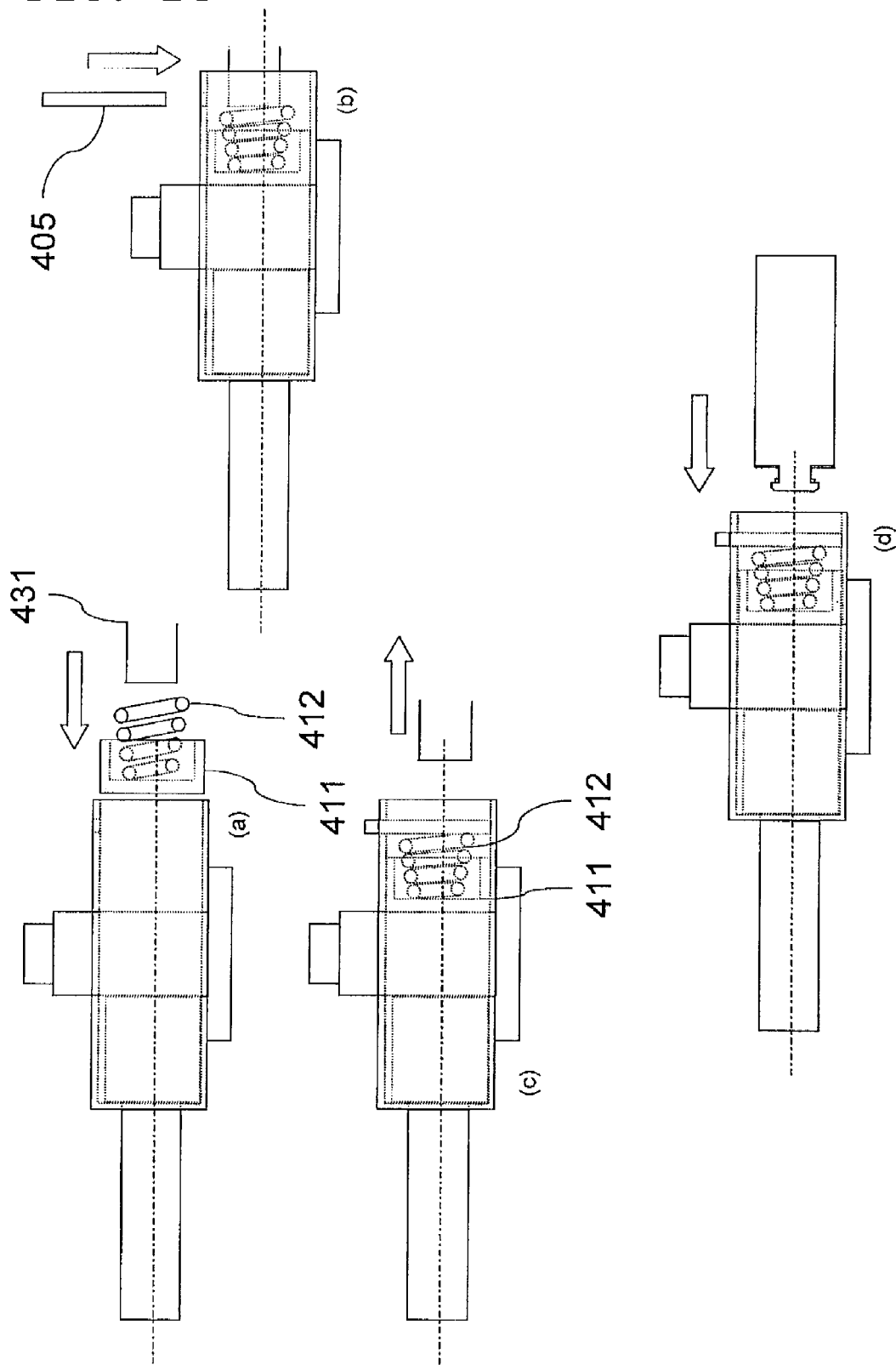
FIG. 14 is a view showing a biaxial hinge assembling process according to the third embodiment of the present invention.

Next, description will be made of a method of setting up a biaxial hinge 401 according to the third embodiment with reference to FIG. 14. Since the steps shown up to FIG. 8(b) are common, they are omitted in the figure. The present step is executed using a jig 431. The jig 431 is a bar whose tip is crushed like a minus driver.

After incorporating the vertical axis portion 304 into the hinge main body 201 (FIG. 8(b)), the pan 411 and the spring 412 are inserted into the hinge main body 201 by using the jig 431 (FIG. 14(a)).

Thereafter, being pressed by the jig 431, the hinge stopper 405 is pushed in (FIG. 14(b)). At this time, setting the jig 431 vertically enables the hinge stopper 405 to be inserted along the opening portion of the hinge stopper 405 to improve working efficiency.

Insertion of the hinge stopper 405 will fix the pan 411 and the spring 412. Thereafter, even if the jig 431 is pulled out, a stable state is maintained (FIG. 14(c)). In this state, pushing the second horizontal axis portion main body 413 into the hinge stopper 405 completes the biaxial hinge 401.

Figure 15:
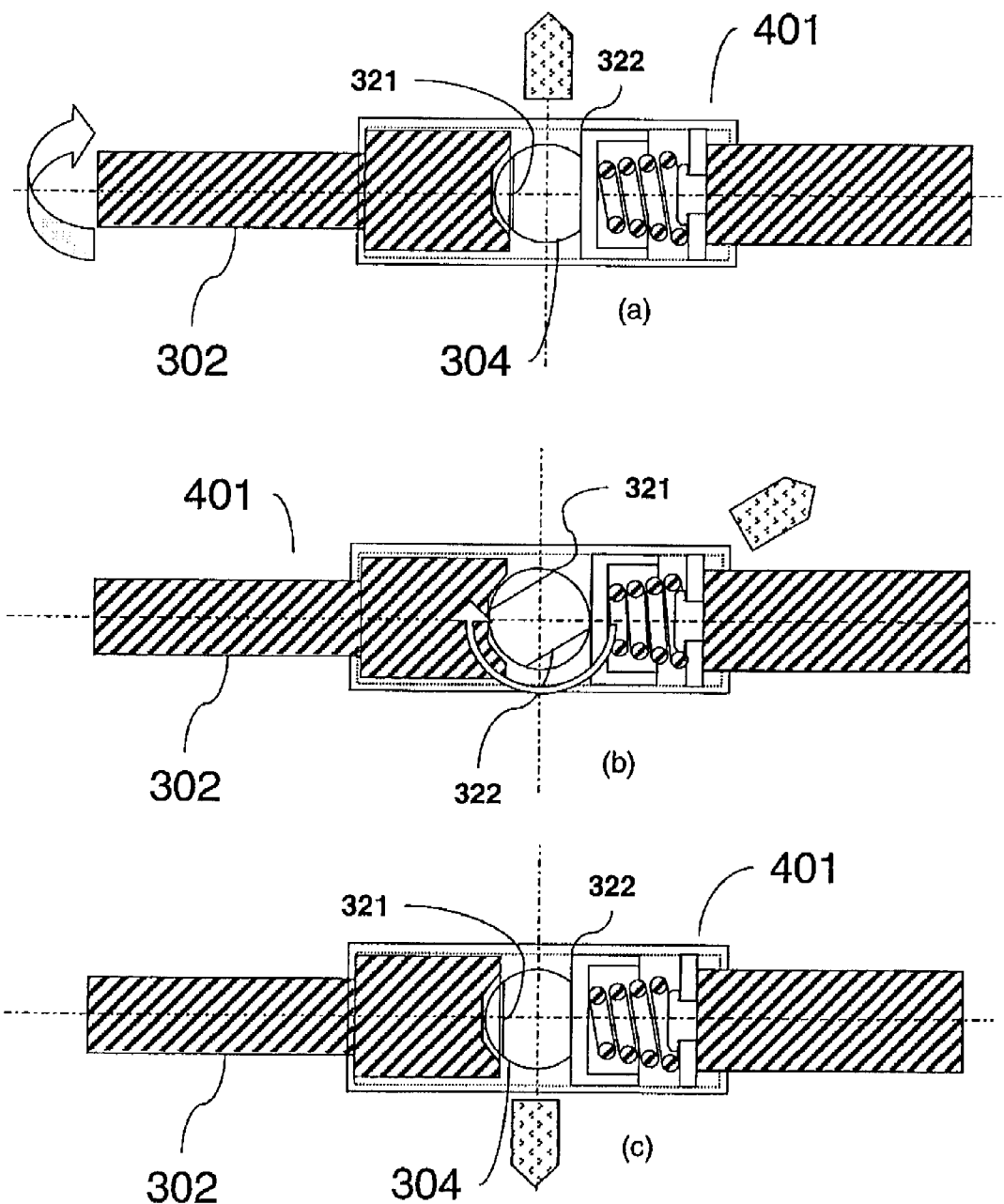
FIG. 15 is a sectional operational view showing operation of the biaxial hinge according to the third embodiment of the present invention.

Next, how the biaxial hinge 401 operates will be described with reference to FIG. 15. FIG. 15(a) to (c) corresponds to FIG. 12(b) to (d).

Opening the upper casing 2 through an appropriate angle centered around the horizontal axis 101 enables the upper casing 2 to turn centered around the vertical axis 102 (FIG. 15(a)). In this situation, when the upper casing 2 is turned (FIG. 15(b)), it will pass over the cut-out surface 312 to make the distance from the vertical axis 102 to the pan 411 be longer. As a result, force is applied to the spring 412 to generate spring stress. The spring stress conducts to the vertical axis portion 304 to enable torque to be transmitted to an operator.

Then, turning through a fixed angle reaches the cut-out surface 322, so that stress will be rapidly decreased. This enables induction torque to be generated at a predetermined angle.

Thus structuring the biaxial hinge 401 according to the third embodiment not only allows opening and closing operation of the upper casing 2 centered around the horizontal axis 101 but also enables appropriate torque to be applied to turning operation of the upper casing 2 centered around the vertical axis 102 to generate induction torque. In addition, while a conventional example uses the flat spring 704, the structure according to the present embodiment enables use of a coiled spring having excellent durability, resulting in improving reliability of the biaxial hinge as a whole as compared with the conventional example.

Fourth Embodiment

In the above-described respective embodiments, torque can be applied to turn of the vertical axis portion 204 and the vertical axis portion 304. In practice, however, various kinds of interconnections are provided between the upper casing 2 and the lower casing 3. It is therefore desirable to impose fixed restrictions on a turning angle of the upper casing 2.

In the fourth embodiment, description will be made of a method of limiting a rotation angle of a vertical axis portion 504 as a rotation axis at the time of turning of the upper casing 2.

Figure 16:
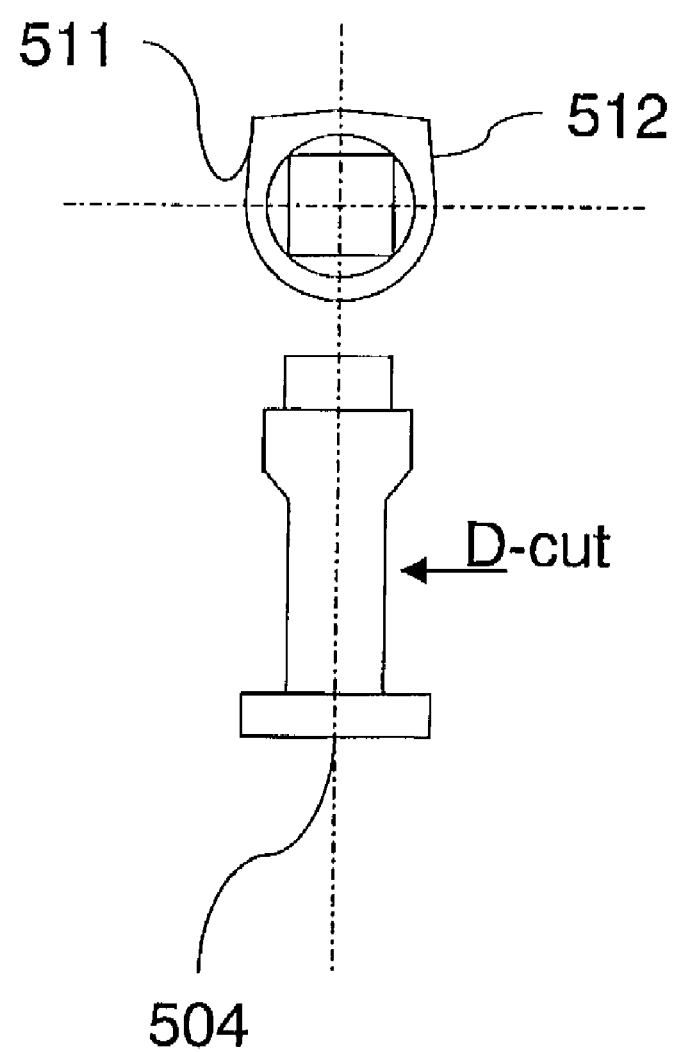
FIG. 16 is a dihedral view of a vertical axis portion according to a fourth embodiment of the present invention.
Figure 17:
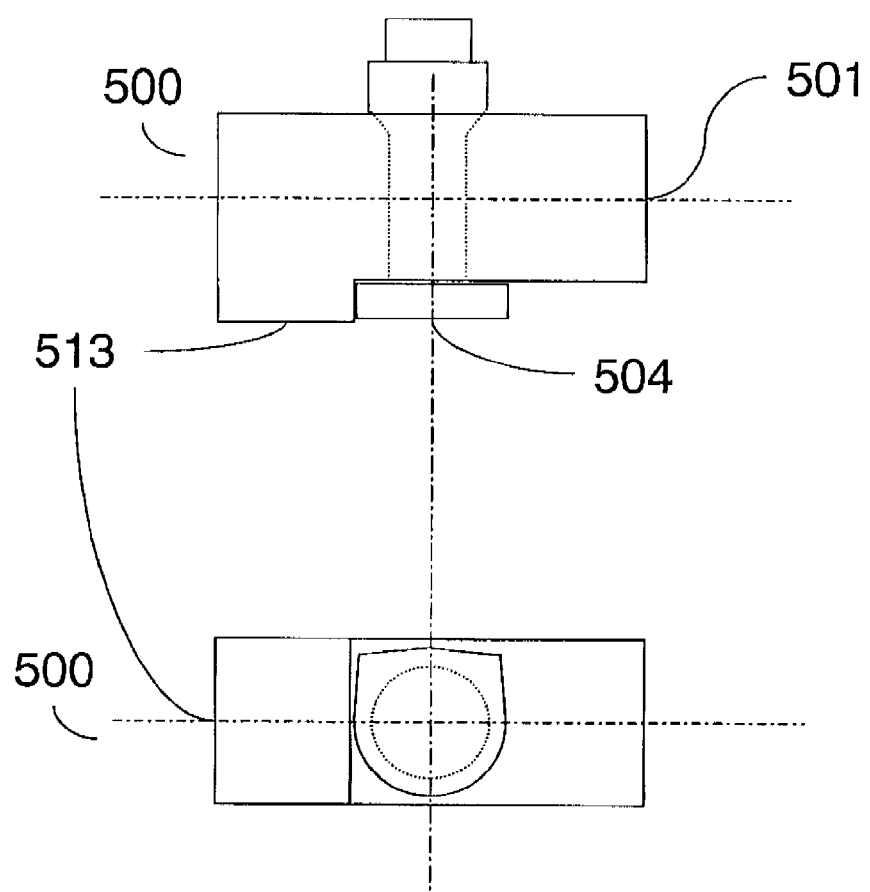
FIG. 17 is a dihedral view showing a hinge main body portion and the vertical axis portion combined according to the fourth embodiment of the present invention.

FIG. 16 is a dihedral view showing the vertical axis portion 504 used in the fourth embodiment. On the other hand, FIG. 17 is a dihedral view of assembled hinge main body portion 501 and vertical axis portion 504 which are used in the present embodiment.

Difference between the hinge main body portion 501 and the above-described hinge main body portion 201 resides in whether a protrusion 513 is provided or not. Then, the difference between the vertical axis portion 504 and the vertical axis portion 304 resides in whether a gill-like member 511 and a gill-like member 512 are provided or not.

A distance from the vertical axis 102 as the center of the vertical axis 504 to the farthest portion of the gill-like member 511 or the gill-like member 512 is assumed to be longer than a distance from the vertical axis 102 of the hinge main body portion 501 to the protrusion 513. This arrangement prevents the hinge main body portion 501 and the vertical axis portion 504 from being set up in a condition which affects wiring.

Figure 18:
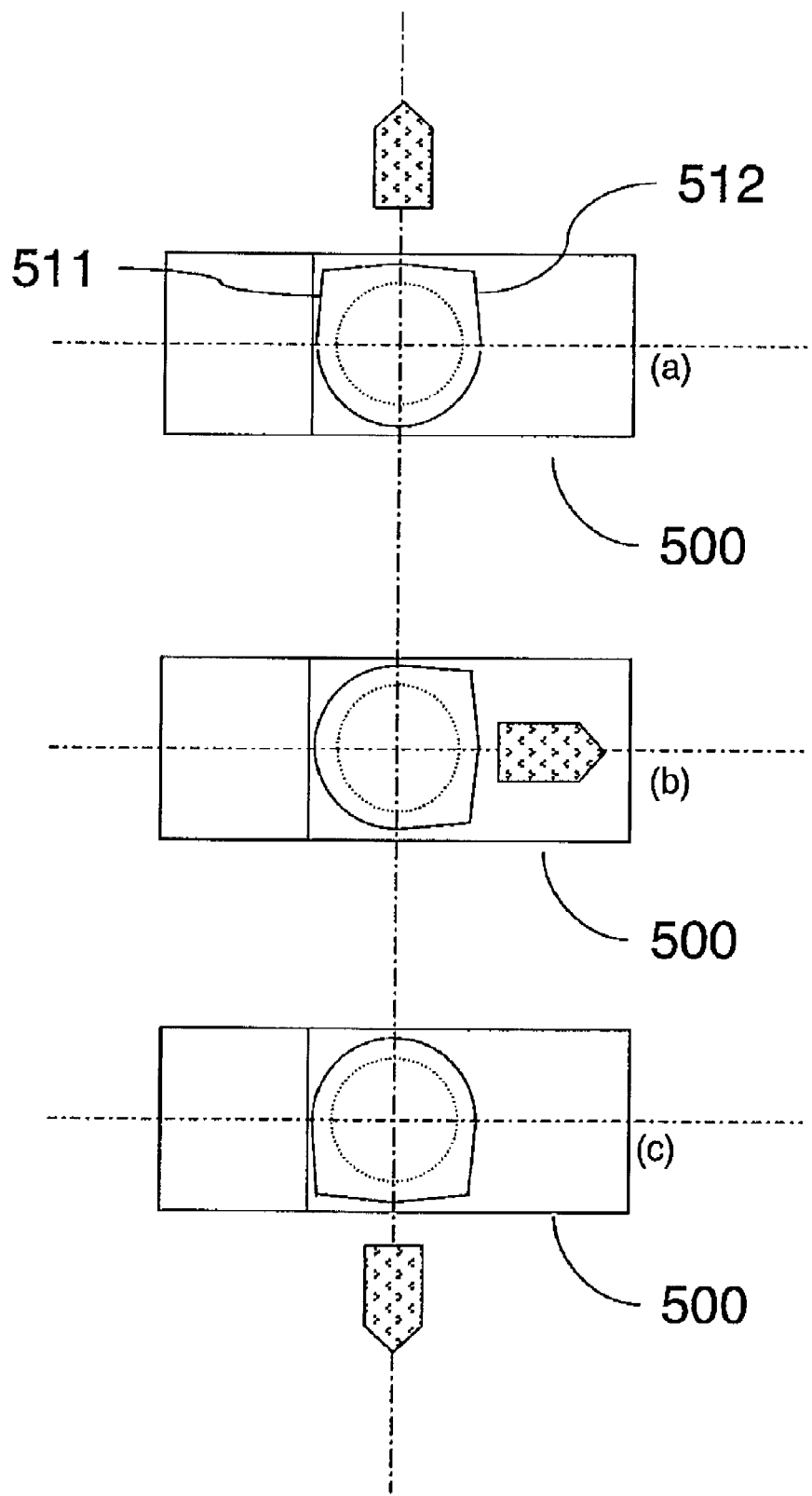
FIG. 18 is a bottom view showing operation of a biaxial hinge according to the fourth embodiment of the present invention.

Next, with reference to FIG. 18 showing operation of the vertical axis portion 504 seen from the bottom of a biaxial hinge 500, operation of the vertical axis portion 504 according to the fourth embodiment will be described. Also here, a pentagonal arrow indicates a direction of the display unit 11.

FIG. 18(a) is a view showing a state where turning operation of the vertical axis portion 504 is restricted by using the gill-like member 511. In this state, it is impossible to turn the vertical axis portion 504 counterclockwise (leftward turn). This is because the gill-like member 511 interferes with the protrusion 513. On the other hand, since no restriction is imposed in the clockwise (rightward turn) direction, it can be turned at will.

FIG. 18(b) shows a state where the vertical axis portion 504 is rotated through an angle of substantially 90 degrees. In this state, the portion can be turned in either direction, rightward or leftward. This is because no restriction is received from the gill-like member 511 or the gill-like member 512.

FIG. 18(c) shows a state where the vertical axis portion 504 is further rotated through an angle of substantially 90 degrees (an angle of substantially 180 degrees from FIG. 18(a)). Upon entering this state, the portion can not be turned clockwise (rightward turn) because the gill-like member 512 interferes with the protrusion 513.

As described above, the fourth embodiment has a structure in which operation of the vertical axis portion 504 is restricted by combining the gill-like member 511 and the gill-like member 512 and the protrusion 513. This enables disconnection of wirings connecting the upper casing 2 and the lower casing 3 to be prevented.

Figure 19:
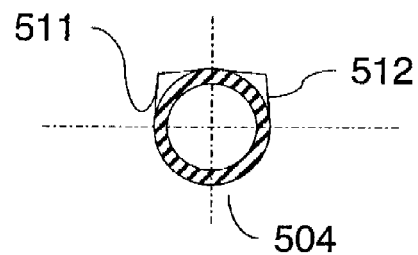
FIG. 19 is a view showing a section of the biaxial hinge according to the fourth embodiment of the present invention.

While in the present embodiment, the thickness of the gill-like member 511 and the gill-like member 512 are set to be equivalent to that of other flange portion, making only the part of the gill-like member 511 and the gill-like member 512 be thin enables axis rotation operation to be ensured even when force stronger than that generated by assumable operation is applied. In other words, it should be also considered to make the gill-like member 511 and the gill-like member 512 other than a part represented by slanting lines (flange portion) in FIG. 19 be thin to give some degree of durability to the biaxial hinge 500 even when vertical bulge is generated, thereby preventing inoperativeness. Structure realizing this aim is enabled upon application of torque by the second horizontal axis portion at the time of turning centered around the vertical axis as in the third embodiment. More specifically, when torque is generated by the flat spring 704 as in the conventional example, it should be in contact with the hinge main body portion 501 to some extent in order to generate stress in the direction of the vertical axis 102, and therefore a thickness in the vertical direction should be ensured. On the other hand, because the present invention needs not take stress in the vertical axis direction into consideration, there is no hindrance to thinning.

Fifth Embodiment

Figure 20:
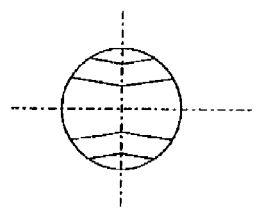
FIG. 20 is a view showing a groove configuration of a first horizontal axis portion according to a fifth embodiment of the present invention.

In FIG. 10 showing the second embodiment, a simple groove is provided in the first horizontal axis portion 302. In terms of failure proof, however, fixed "idle" is required for industrial products. The fifth embodiment, therefore, has a structure in which "idle" can be provided for operation of a vertical axis portion by the tapering with the center line of the axis as a boundary as shown in FIG. 20.

Sixth Embodiment

In the first embodiment to the fourth embodiment, the vertical axis 102 is orthogonal (literally crossing at one point) to the horizontal axis 101. In terms of adjustment of the thickness of the upper casing 2, such relationship might be hindrance in design.

Figure 21:
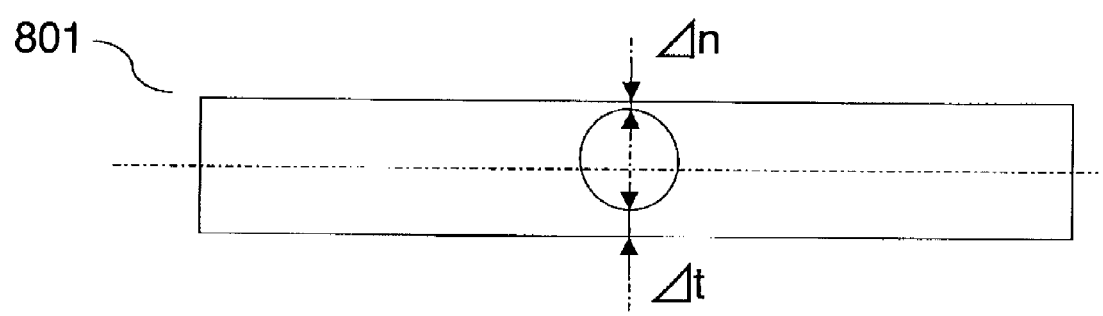
FIG. 21 is a view for use in explaining a problem of a conventional biaxial hinge.

FIG. 21 is a view of a horizontal axis portion 801 seen from right above which is used in a conventional biaxial hinge. This figure shows a problem occurring when the vertical axis 102 is prevented from being orthogonal to the horizontal axis 101. In the conventional example, the vertical axis portion (not shown) is passed through the horizontal axis portion 801. As a result, setting the vertical axis 102 not to be orthogonal to the horizontal axis 101 causes a thin part ($\Delta n$) and a thick part ($\Delta t$) to present a problem in strength design.

Figure 22:
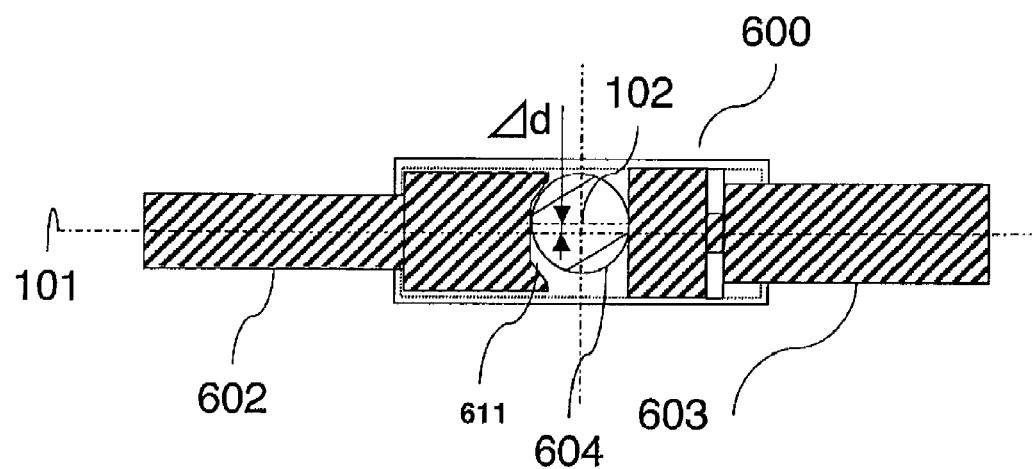
FIG. 22 is a sectional view of a biaxial hinge according to a sixth embodiment of the present invention.

FIG. 22 is a sectional view of a biaxial hinge 600 being set up which shows the sixth embodiment (equivalent to FIG. 10 of the second embodiment).

As is clear also from the figure, expanding a width of a groove portion 611 provided in a first horizontal axis 602 to be larger than the groove portion 311 of the second embodiment enables a deviation of $\Delta d$ to be made between the horizontal axis 101 and the vertical axis 102. In other words, because of being originally divided into the first horizontal axis 602 and a second horizontal axis 603, strength of the horizontal axis portion should not be taken into consideration.

Figure 23:
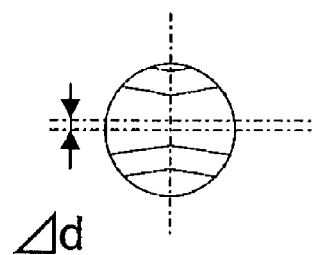
FIG. 23 is a view showing one of groove configurations of a first horizontal axis portion according to the sixth embodiment of the present invention.

In addition, deviation between the horizontal axis 101 and the vertical axis 102 can be coped with by displacing the groove by the amount of the deviation of $\Delta d$ as shown in FIG. 23 (the original figure with no deviation is FIG. 20).

Thus, the vertical axis 102 can be arranged with a deviation of $\Delta d$ with ease to result in increasing the degree of freedom in design with respect to the thickness of the upper casing 2.

At this time, because a vertical axis portion 604 locates deviated from the horizontal axis portion 101, unexpected moment occurs, so that an expected angle of the upper casing 2 might not be obtained. For improving the problem, one solution is to slant an angle of one or both of opposite cut-out portions of the vertical axis portion 604 facing to each other in advance.

As described in the foregoing, the present invention enables the size of each component forming a biaxial hinge to be reduced to result in allowing down-sizing of the biaxial hinge as a whole. Furthermore, along with the reduction in size of the biaxial hinge, the size of electronic apparatus itself incorporating the biaxial hinge can be reduced as well.

INDUSTRIAL USE

As described in the foregoing, the present invention is applicable to a cordless phone other than a mobile phone, a PHS (Personal Handy Phone System) and an IP phone.

The invention claimed is:
1. A biaxial hinge mechanism comprising:
a housing;
first and second horizontal axis portions inserted into the housing and provided on a horizontal axis;
a vertical axis portion inserted into the housing and provided on a vertical axis which is substantially orthogonal to the horizontal axis,
wherein the first and second horizontal axis portions facilitate the biaxial hinge mechanism to rotate about the horizontal axis,
wherein the vertical axis portion facilitates the biaxial hinge mechanism to rotate about the vertical axis, and
wherein the housing comprises:
a first through hole through which the first horizontal axis portion is inserted into and extends outside the housing;
an opening which is opposite the first through hole, wider than a widest portion of the first horizontal axis portion, and wider than a widest portion of the second horizontal axis portion that is located inside the housing, wherein the second horizontal axis portion is inserted into and extends outside the housing through the opening; and
a second through hole through which the vertical axis portion is inserted into and extends outside the housing,
wherein said vertical axis portion has a vertical axis side surface disposed in contact with a horizontal axis end of said first horizontal axis portion and a horizontal axis end of said second horizontal axis portion, wherein two substantially opposite sides of the vertical axis side surface of said vertical axis portion are cut out, wherein a groove is provided on the horizontal axis end of said first horizontal axis portion which is in contact with the vertical axis portion, wherein when the groove is orthogonal to the cut-out portion of said vertical axis portion, rotation of the vertical axis portion is regulated, and when the groove is brought into parallel to the cut-out portion of said vertical axis portion, the regulation on rotation of said vertical axis portion canceled, wherein two gill-like members for limiting a rotation angle of said vertical axis portion are provided in said vertical axis portion, and a protrusion which interferes with the gill-like members according to a rotation angle of said vertical axis portion is provided in said housing, wherein a taper with the center line of the horizontal axis as a boundary is formed in the groove of said first horizontal axis portion, wherein a diameter of the portion of the first and second horizontal axis portions located in said housing is larger than a diameter of the portion extended from said housing, wherein said groove is disposed out of said horizontal axis.

2. A biaxial hinge mechanism according to claim 1, wherein:
the vertical axis portion is disposed between the horizontal axis end of said first horizontal axis portion and the horizontal axis end of said second horizontal axis portion.

3. The biaxial hinge mechanism according to claim 1, wherein said second horizontal axis portion comprises a pan, an elastic body and a second horizontal axis portion main body.

4. The biaxial hinge mechanism according to claim 3, wherein the elastic body is a coiled spring.

5. The biaxial hinge mechanism according to claim 1, wherein said groove is disposed on said horizontal axis.

6. The biaxial hinge mechanism according to claim 2, further comprising a stopper, wherein said second horizontal axis portion is fixed to the housing by the stopper.

7. The biaxial hinge mechanism according to claim 6, wherein said stopper fixes said second horizontal axis portion by snap-fit.

8. An electronic apparatus having the biaxial hinge mechanism recited in claim 1.

9. A mobile phone having the biaxial hinge mechanism recited in claim 1.

* * * * *